United States Patent
Tanaka et al.

(10) Patent No.: US 9,735,428 B2
(45) Date of Patent: Aug. 15, 2017

(54) NEGATIVE ELECTRODE MATERIAL FOR LITHIUM ION SECONDARY BATTERIES, NEGATIVE ELECTRODE FOR LITHIUM ION SECONDARY BATTERIES, LITHIUM ION SECONDARY BATTERY, METHOD FOR PRODUCING NEGATIVE ELECTRODE MATERIAL FOR LITHIUM ION SECONDARY BATTERIES, AND METHOD FOR PRODUCING NEGATIVE ELECTRODE FOR LITHIUM ION SECONDARY BATTERIES

(71) Applicant: Hitachi, Ltd., Tokyo (JP)

(72) Inventors: Akihide Tanaka, Tokyo (JP); Etsuko Nishimura, Tokyo (JP); Kento Hoshi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 226 days.

(21) Appl. No.: 14/416,873

(22) PCT Filed: Jun. 28, 2013

(86) PCT No.: PCT/JP2013/067757
§ 371 (c)(1),
(2) Date: Jan. 23, 2015

(87) PCT Pub. No.: WO2014/017252
PCT Pub. Date: Jan. 30, 2014

(65) Prior Publication Data
US 2015/0207146 A1 Jul. 23, 2015

(30) Foreign Application Priority Data
Jul. 24, 2012 (JP) .................................. 2012-163221

(51) Int. Cl.
| | |
|---|---|
| *B05D 5/12* | (2006.01) |
| *H01M 4/587* | (2010.01) |
| *H01M 4/133* | (2010.01) |
| *H01M 4/1393* | (2010.01) |
| *H01M 4/04* | (2006.01) |
| *H01M 4/36* | (2006.01) |
| *H01M 4/62* | (2006.01) |
| *H01M 10/052* | (2010.01) |
| *H01M 4/02* | (2006.01) |

(52) U.S. Cl.
CPC ......... *H01M 4/587* (2013.01); *H01M 4/0404* (2013.01); *H01M 4/0416* (2013.01); *H01M 4/0471* (2013.01); *H01M 4/133* (2013.01); *H01M 4/1393* (2013.01); *H01M 4/364* (2013.01); *H01M 4/62* (2013.01); *H01M 4/622* (2013.01); *H01M 10/052* (2013.01); *H01M 2004/021* (2013.01); *H01M 2004/027* (2013.01)

(58) Field of Classification Search
CPC combination set(s) only.
See application file for complete search history.

(56) References Cited

U.S. PATENT DOCUMENTS

| | | | |
|---|---|---|---|
| 2003/0170534 A1 | 9/2003 | Kim et al. | |
| 2005/0130040 A1 | 6/2005 | Yang et al. | |
| 2006/0003232 A1 | 1/2006 | Jung et al. | |
| 2011/0163274 A1* | 7/2011 | Plee ...................... | H01M 4/134 252/503 |
| 2012/0070733 A1 | 3/2012 | Yamada et al. | |
| 2013/0224588 A1* | 8/2013 | Kageura ............... | H01M 4/131 429/211 |
| 2015/0140423 A1* | 5/2015 | Brown ................. | H01M 4/0404 429/213 |

FOREIGN PATENT DOCUMENTS

| | | |
|---|---|---|
| JP | 2003-263988 A | 9/2003 |
| JP | 2005-150117 A | 6/2005 |
| JP | 2006-019274 A | 1/2006 |
| JP | 2011-198710 A | 10/2011 |
| JP | 2012-094505 A | 5/2012 |
| JP | 2012-109239 A | 6/2012 |
| WO | 2012/157590 A1 | 11/2012 |

\* cited by examiner

*Primary Examiner* — Austin Murata
(74) *Attorney, Agent, or Firm* — Volpe and Koenig, P.C.

(57) ABSTRACT

Provided is a negative electrode material for a lithium ion secondary battery, which has excellent high-temperature storage characteristics and cycle characteristics. The negative electrode material for a lithium ion secondary battery has a high molecular weight polymer adsorbed on a carbon material, the O/C value of surface functional group quantity is 4.5% or more and 25% or less in the negative electrode material for a lithium ion secondary battery, and the S/C value of surface functional group quantity is 0.05% or more and 2.5% or less in the negative electrode material for a lithium ion secondary battery. Also provided are a negative electrode for a lithium ion secondary battery, lithium ion secondary battery, and methods for producing the negative electrode material, the negative electrode, and the battery.

14 Claims, 1 Drawing Sheet

NEGATIVE ELECTRODE MATERIAL FOR LITHIUM ION SECONDARY BATTERIES, NEGATIVE ELECTRODE FOR LITHIUM ION SECONDARY BATTERIES, LITHIUM ION SECONDARY BATTERY, METHOD FOR PRODUCING NEGATIVE ELECTRODE MATERIAL FOR LITHIUM ION SECONDARY BATTERIES, AND METHOD FOR PRODUCING NEGATIVE ELECTRODE FOR LITHIUM ION SECONDARY BATTERIES

TECHNICAL FIELD

The present invention relates to a negative electrode active material for a lithium ion secondary battery, a negative electrode for a lithium ion secondary battery, a lithium ion secondary battery, and methods for producing the material, electrode, and battery.

BACKGROUND ART

In recent years, the development of lithium ion secondary batteries has been actively advanced. PTL 1 discloses a technique for providing a negative electrode material for a lithium secondary battery, which has a high capacity and favorable charge-discharge load characteristics, by loading a water-soluble polymer (B) on a carbon material (A) with the O/C value of surface functional group quantity of 1% or more and 4% or less. PTL 2 discloses a technique for providing a negative electrode material capable of achieving a lithium ion secondary battery which has a charge-discharge irreversible capacity observed in an initial cycle, has excellent high-temperature storage characteristics, and reduces gas generation in the initial cycle and high-temperature storage, from a carbon material for a lithium ion secondary battery, which is characterized in that the O/C value of surface functional group quantity is 1% or more and 4% or less, and the sum (Cl/C+S165/C) of the Cl/C value of surface functional group quantity expressed in a specific formula and S165/C value of surface functional group quantity expressed in a specific formula is 0.05% or more and 0.5% or less.

CITATION LIST

Patent Literature

PTL 1: JP 2011-198710 A
PTL 2: JP 2010-219036 A

SUMMARY OF INVENTION

Technical Problem

Lithium ion secondary batteries have battery capacities decreased by leaving under high-temperature environments and in charge-discharge cycles. This decrease in battery capacity is significant when an electrolyte solution is likely to be decomposed on a graphite surface, or when heat is generated in charge and discharge.

Therefore, it is known that high-temperature storage characteristics are improved by adsorbing a water-soluble polymer onto the graphite surface. However, when the water-soluble polymer is adsorbed onto the graphite surface, there is a tendency to cause an increase in battery resistance or decrease the cycle characteristics.

As a countermeasure against the tendency, the use of hydrophilic graphite for graphite as a core material is disclosed in PTL 1. This PTL 1 mentions therein that the increased hydrophilicity of the negative electrode surface causes the negative electrode surface and, a high molecular weight polymer to interact with each other, thereby making it possible to make the adsorbent less likely to peel off. However, there is a tendency to still cause an increase in battery resistance or decrease the cycle characteristics, because inhomogenization of water-soluble polymer adsorption cannot be completely prevented even when just the graphite as a core material is limited.

In addition, PTL 2 discloses a technique for improving high-temperature storage characteristics by treating the graphite surface with sulfuric acid or hydrochloric acid to introduce, onto the graphite surface, a halogen group or a sulfo group which has a stronger electron-attracting property than an oxygen-containing functional group. However, because of the treatment with sulfuric acid, the graphite surface is poor in sulfo-group homogeneity, and there is a tendency to still cause an increase in battery resistance or decrease the cycle characteristics.

The present invention is intended to solve the problems mentioned above, and an object of the invention is to provide a negative electrode material for a lithium ion secondary battery, which has excellent high-temperature storage characteristics and cycle characteristics.

Solution to Problem

Here are features of the present invention for solving the problems mentioned above, for example.

A negative electrode material for a lithium ion secondary battery, which has a high molecular weight polymer adsorbed on a carbon material, wherein the O/C value of surface functional group quantity is 4.5% or more and 25% or less in the negative electrode material for a lithium ion secondary battery, and the S/C value of surface functional group quantity is 0.05% or more and 2.5% or less in the negative electrode material for a lithium ion secondary battery.

A method for producing a negative electrode material for a lithium ion secondary battery, which has a high molecular weight polymer adsorbed on a carbon material, wherein the O/C value of surface functional group quantity is 4.5% or more and 25% or less in the negative electrode material for a lithium ion secondary battery, the S/C value of surface functional group quantity is 0.05% or more and 2.5% or less in the negative electrode material for a lithium ion secondary battery, and when the carbon material is dispersed in 50 mass % purified water, the purified water has pH of 6 or more.

A method for producing a negative electrode for a lithium ion secondary battery, wherein the negative electrode includes: a negative electrode material for a lithium ion secondary battery, which has a high molecular weight polymer adsorbed on a carbon material; and a binder, the O/C value of surface functional group quantity is 4.5% or more and 25% or less in the negative electrode material for a lithium ion secondary battery, the S/C value of surface functional group quantity is 0.05% or more and 2.5% or less in the negative electrode material for a lithium ion secondary battery, and the method includes the steps of: preparing negative electrode combination slurry for a lithium ion secondary battery by kneading the carbon material, the high molecular weight polymer, and the binder; and applying the negative electrode combination slurry for a lithium ion secondary battery onto a negative electrode collector.

Advantageous Effects of Invention

The present invention can provide a negative electrode material for a lithium ion secondary battery, which has excellent high-temperature storage characteristics and cycle characteristics. Objects, compositions, and advantageous effects other than the foregoing will be clarified with reference to the following description of embodiments.

DESCRIPTION OF EMBODIMENTS

Embodiments of the present invention will be described below with reference to the drawing, etc. The following description is intended to give specific examples of the subject matter of the present invention, and the present invention is not to be considered limited by the description, but various changes and modifications can be made by one skilled in the art within the scope of the technical idea disclosed in this specification. Furthermore, through the drawing for describing the present invention, elements which have the same functions are denoted by the same sings, and repeated descriptions of the elements may be omitted in some cases.

The term "step" in this specification encompasses therein not only independent steps, but also more steps as long as desired actions of the steps are achieved even when the steps are not able to be clearly distinguished from the other steps. In addition, the numerical ranges indicated with the use of the term "to" in this specification indicate ranges including the numerical values before and after the term "to" respectively as the minimum value and the maximum value. The publications, patents, and patent applications cited in this specification are all considered to be incorporated herein by reference in their entirety.

Figure 1:
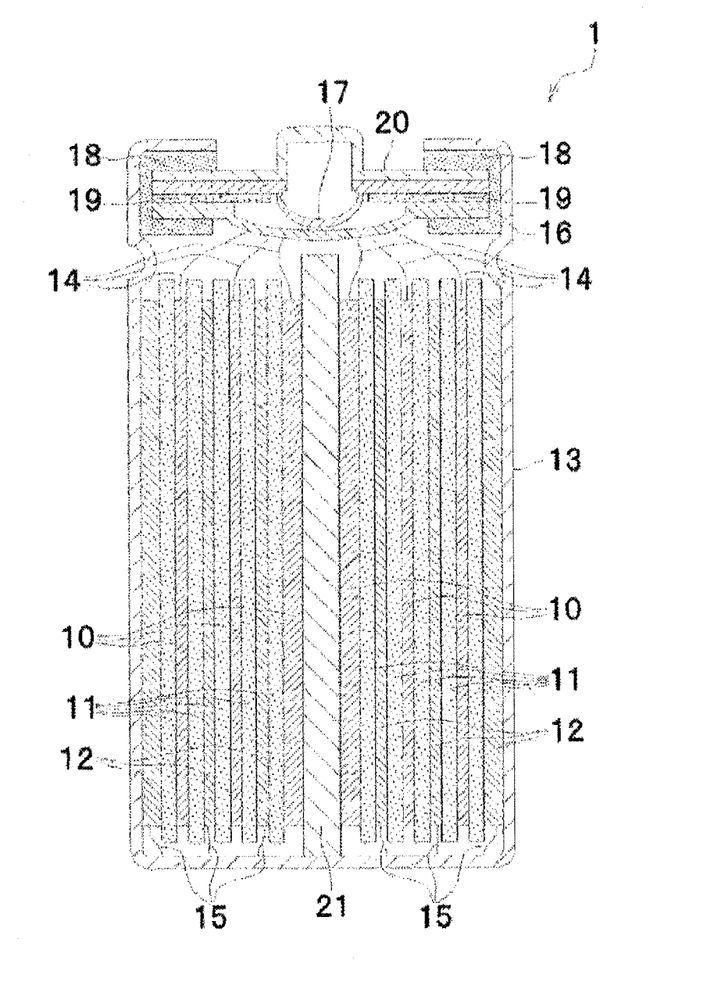
FIG. 1 is a diagram schematically illustrating an internal structure of a battery according to an embodiment of the present invention.

FIG. 1 is a diagram schematically illustrating an internal structure of a battery according to an embodiment of the present invention. The battery 1 shown in FIG. 1 according to an embodiment of the present invention is composed of a positive electrode 10, a separator 11, a negative electrode 12, a battery can 13, a positive electrode collector tab 14, a negative electrode collector tab 15, an inner lid 16, an internal pressure open valve 17, a gasket 18, a resistive element 19 of positive temperature coefficient (Positive temperature coefficient; PTC), a battery lid 20, and a shaft center 21. The battery lid 20 is an integrated component composed of the inner lid 16, the internal pressure open valve 17, the gasket 18, and the resistive element 19. In addition, the positive electrode 10, the separator 11, and the negative electrode 12 are wound around the shaft center 21.

The separator 11 is inserted between the positive electrode 10 and the negative electrode 12, and wound around the shaft center 21 to prepare an electrode group. Any known shaft center can be used as the shaft center 21, as long as the shaft center can support the positive electrode 10, the separator 11, and the negative electrode 12. The electrode group may have, besides the cylindrical shape shown in FIG. 1, various shapes such as stacked strip electrodes or the positive electrode 10 and negative electrode 12 wound into any shape such as a flat form. For the shape of the battery can 13, shapes such as a cylindrical shape, a flat oblong shape, a flat elliptic shape, and a rectangular shape, may be selected to fit on the shape of the electrode group.

The material of the battery can 13 is selected from materials which have corrosion resistance to the non-aqueous electrolyte, such as aluminum, stainless steel, and nickel plated steel. In addition, when the battery can 13 is electrically connected to the positive electrode 10 or the negative electrode 12, the material of the battery can 13 is selected to prevent the battery can 13 from corrosion and prevent the material from alteration by alloying with lithium ions in the section in contact with the non-aqueous electrolyte.

The electrode group is housed in the battery can 13, the negative electrode collector tab 15 is connected to the inside wall of the battery can 13, and the positive electrode collector tab 14 is connected to the bottom of the battery lid 20. The electrolyte solution is injected into the can 13 before sealing the battery. Methods for injecting the electrolyte solution include a method of direct addition to the electrode group with the release of the battery lid 20, or a method of addition from an inlet located in the battery lid 20.

Thereafter, the battery lid 20 is closely attached to the battery can 13 to seal the entire battery. When there is an inlet for the electrolyte solution, the inlet is also hermetically sealed. Methods for sealing the battery include known techniques such as welding and swaging.

The lithium ion secondary battery according to an embodiment of the present invention can be produced by, for example, placing a negative electrode and a positive electrode such as the following to be opposed with a separator interposed therebetween, and injecting an electrolyte. The structure of the lithium ion battery according to an embodiment of the present invention is not particularly limited, but can be typically a wound electrode group obtained by winding the positive electrode and negative electrode and the separator which separates the electrode, or a stacked electrode group by stacking the positive electrode, the negative electrode, and the separator.

The configuration of the battery shown in FIG. 1 is absolutely an example of the internal structure of the lithium ion secondary battery to which the negative electrode material for a lithium secondary battery according to an embodiment of the present invention is applicable, and the battery to which the negative electrode according to an embodiment of the present invention is applicable is not to be considered limited to that shown in FIG. 1.

<Negative Electrode>

As a result of studies earnestly carried out by the inventors, it has been determined that the most important aspect for the high molecular weight polymer is to ensure the uniformity of the high molecular weight polymer adsorbed. The inhomogeneously thickened high molecular weight polymer serves as a resistance component, and thus increases the battery resistance. Moreover, during the cycle, heat is generated to cause inhomogeneous deterioration within the battery. The inhomogenization is extremely problematic, because the deterioration during the cycle is further accelerated.

In view of the previously mentioned problem, as a result of studies carried out by the inventors, it has been determined that the inhomogeneous adsorption of the high molecular weight polymer is largely affected by the fact that the high molecular weight polymer itself flocculates when the high molecular weight polymer is adsorbed. More specifically, the maintenance of dispersibility is the most important to the polymer adsorption.

Furthermore, as result of carrying out earnest studies, it has been found that in order to maintain the dispersibility of the high molecular weight polymer, a high molecular weight polymer adsorbed on a carbon material such as graphite or covalently bonded to a functional group of a carbon material, which has a functional group containing sulfur, can be selected as a solution.

The high molecular weight polymer in which the functional group has sulfur has high polarity, and can maintain high dispersibility in the case of carrying out adsorption treatment. Furthermore, the homogeneity is also considered to be able to be improved, because the group reacts with an oxygen functional group at an end of the graphite on the graphite surface into a sulfo group.

The negative electrode material according to an embodiment of the present invention has a high molecular weight polymer having a sulfur-containing functional group, which is adsorbed on the surface of a carbon material that is a negative electrode active material. The substance formed on the surface of the negative electrode active material may include those other than the high molecular weight polymer having a sulfur-containing functional group, or may have only the high molecular weight polymer having a sulfur-containing functional group.

The negative electrode material with the high molecular weight polymer adsorbed thereon is characterized in that the O/C value of surface functional group quantity, which is expressed by the following formula 1, is 4.5% or more and 25% or less, and the S/C value of surface functional group quantity, which is expressed by the following formula 2, is 0.05% or more and 2.5% or less.

O/C Value (%)=O Atom Concentration figured out on the basis of Peak Area of O 1s Spectrum in X-ray photoelectron spectroscopy (XPS) Analysis/C Atom Concentration figured out on the basis of Peak Area of C 1s Spectrum in XPS Analysis×100     Formula 1

S/C Value (%)=S Atom Concentration figured out on the basis of Peak Area of S 2p Spectrum in X-ray photoelectron spectroscopy (XPS) Analysis/C Atom Concentration figured out on the basis of Peak Area of C 1s Spectrum in XPS Analysis×100     Formula 2

When the O/C is lower than 4.5%, the small quantity of sulfo group derived from the coating layer corresponds to the exposed carbon surface. Therefore, there is a possibility of decreasing high-temperature storage characteristics and cycle life characteristics. When the O/C is higher than 25%, there is a possibility of partially thickening the coating layer to decrease the cycle time.

When the S/C is lower than 0.05%, the small quantity of sulfo group derived from the coating layer corresponds to the exposed carbon surface. Therefore, there is a possibility of decreasing high-temperature storage characteristics and cycle life characteristics. The S/C higher than 2.5% corresponds to the partially thickened coating layer. Therefore, there is a possibility of decreasing cycle characteristics.

The O/C is preferably 4.7% or more and 20% or less, further preferably, 6.0% or more and 16% or less, and furthermore preferably 6.5% or more and 12.0% or less. The S/C is preferably 0.2% or more and 2.0% or less, further preferably 0.30% or more and 1.5% or less, and furthermore preferably 0.40% or more and 1.2% or less.

For these XPS measurements, commercially available X-ray photoelectron spectrometers can be used. The samples are set so as to make the surfaces as horizontal as possible, and spectra are measured for C is (280 eV to 290 eV), O 1s (525 eV to 540 eV), and S 2p (160 eV to 175 eV). In that regard, it is preferable to correct the electrical charge on the C is peak top or the like. The peak area of the obtained spectrum is found, and further multiplied by a relative sensitivity factor RSF to calculate the atom concentration.

Either the simple negative electrode active material for a lithium ion secondary battery or the negative electrode active material for a lithium ion secondary battery on a negative electrode may be used for the evaluation of the O/C, S/C, and $SO_3$ peak ratio in the O 1s for the negative electrode active material for a lithium ion secondary battery according to this example. In the case of using the negative electrode active material for a lithium ion secondary battery on a negative electrode, the negative electrode active material for a lithium ion secondary battery is preferably scraped off from the negative electrode or subjected to cleaning for salts, etc. in an appropriate manner.

Furthermore, the O 1s peak preferably has therein a peak derived from $SO_3$, which appears around 532 eV. The peak area derived from $SO_3$ preferably accounts for 10% or more in the O 1 s, when the O 1s peak is subjected to curve fitting with peaks derived from $SO_3$, which represent C—O and appear around 533.5 eV and 532 eV, to find the peak area of the obtained spectrum. The peak area is further preferably 20% or more, furthermore preferably 40% or more, and yet furthermore preferably 60% or more. When the peak area derived from $SO_3$ is less than 10% in the O 1s, the small quantity of sulfo group derived from the coating layer corresponds to the exposed carbon surface. Therefore, there is a possibility of decreasing high-temperature storage characteristics and cycle life characteristics.

In addition, when the carbon material is immersed and dispersed in purified water to prepare 50 mass % purified water, the pH of the 50 mass % purified water is preferably 6 or more. For the pH, commercially available pH measurement instruments (for example, CyberScan pH 110 from Eutech) can be used. In addition, the carbon material is preferably removed by filtration, if necessary. This is because the dispersibility of the high molecular weight polymer is decreased to decrease the uniform coatability on the graphite surface under the condition that the pH indicates an acidic property.

In addition, examples of the sulfur-containing functional group include, for example, a sulfonic acid group, a sulfonate group, a sulfonyl group, a thiol group, and a sulfide group. This is because these functional groups have high polarity, and improves adsorption homogeneity. One or more of these functional groups may be used as the sulfur-containing functional group.

Among these groups, in particular, in terms of the pH described previously, the form of a salt is preferably contained as the functional group contained in the high molecular weight polymer. The salt is, for example, an alkali metal salt, and examples of the counter ion can include Li, Na, K, and Ca. Among these, Li and Na are particularly preferred. The functional group contained in the high molecular weight polymer may be composed only of the form of a salt, or may contain the form of a salt and any form other than the salt.

Examples of the high molecular weight polymer specifically include a polyvinyl sulfonic acid, polyvinyl sulfonic acid Na, a polystyrene sulfonic acid, and a polystyrene sulfonic acid Na. The weight average molecular weight of the high molecular weight polymer is desirably 10,000 to 1,200,000. The weight average molecular weight mentioned above is regarded as the value measured by liquid chromatography. As the polymerizable functional group for use in the high molecular weight polymer, a vinyl group or a styrene group is desirably used in terms of solubility, but the polymerizable functional group is not limited thereto.

The negative electrode 12 according to an embodiment of the present invention includes a negative electrode active material with the high molecular weight polymer adsorbed thereon, a binder, and a collector. In the case of requiring high-rate charge and discharge, a conducting agent may be added in some cases.

As the negative electrode active material (core material) with the high molecular weight polymer adsorbed thereon, which is able to be used according to an embodiment of the present invention, graphite, non-graphite carbon, and the like can be selected. Among these, in particular, graphite is preferably used for the negative electrode active material. The graphite preferably has a graphite interlayer distance ($d_{002}$) of 0.334 nm or more and 0.338 nm or less. Such graphite is, because of having favorable wettability to the polymer, and also exhibiting low water absorption, suitable for the present production method, and able to further improve the high-temperature storage characteristics and cycle characteristics of the lithium ion secondary battery.

The graphite as the negative electrode active material is produced with the use of, as raw materials, natural graphite, artificial graphite, mesophase carbon, expanded graphite, carbon fibers, vapor-grown carbon fibers, pitch-based carbonaceous materials, needle coke, petroleum coke, and polyacrylonitrile-based carbon fibers, etc., which are able to chemically store and release lithium ions. It is to be noted that the graphite interlayer distance ($d_{002}$) can be measured with the use of XRD (X-Ray Diffraction Method) or the like.

The following method can be used for the method for adsorbing the high molecular weight polymer onto the negative electrode active material. However, the method is not limited thereto, as long as the features mentioned above are satisfied.

The negative electrode active material desirably has particle sizes equal to or less than the thickness of a negative electrode combination layer formed from a negative electrode active material and a binder. When the powder of the negative electrode active material include therein coarse particles which have sizes equal to or more than the thickness of the negative electrode combination layer, it is preferable to remove the coarse particles by sieve classification or wind flow classification in advance, and use particles equal to or less than the thickness of the negative electrode combination layer.

As specific particle sizes, the average particle size obtained through the use of a laser diffraction/scattering particle size distribution measurement system is preferably 3 μm or more and 30 μm or less, further preferably 3 μm or more 25 μm or less, in particular, 5 μm or more and 20 μm or less. In the case of the average particle size in excess of 30 μm, the electrode is more likely to have asperity, and the battery characteristics may be thus decreased in some cases. Alternatively, in the case of less than 3 μm, the graphite is less likely to be crushed, and there is thus a tendency to make it hard to increase the density. It is to be noted that the particle size distribution can be measured with a laser diffraction/scattering particle size distribution measurement system by dispersing the sample in purified water containing a surfactant, and the average particle size is calculated as a 50% accumulation particle size (50% D).

Furthermore, as for the carbon material for the negative electrode active material according to an embodiment of the present invention, the specific surface area figured out through the use of a BET (Brunauer-Emmet-Teller) method from an adsorption isotherm obtained by nitrogen adsorption measurement at 77 K is preferably 0.1 $m^2$/g or more and 10 $m^2$/g or less. In the case of that less than 0.1 $m^2$/g, charge-discharge characteristics may be deteriorated in some cases, because of the decreased area for the reaction between the negative electrode active material and lithium ions. Alternatively, in the case of that over 10 $m^2$/g, the reaction with the electrolyte is more likely to be developed, and there is a possibility that the irreversible capacity will be increased to deteriorate the life characteristics.

<Pre-Adsorption>

The high molecular weight polymer to be adsorbed is preferably dissolved in pure water to provide an aqueous solution in advance from the perspective of improving the adsorption homogeneity. The method for preparing the aqueous solution of the high molecular weight polymer is not particularly limited, but there is a need for attention to keep from leaving any undissolved residue, because the undissolved residue causes inhomogenization. For example, the polymer can be dissolved by adding the polymer little by little while stirring with a propeller or a wave rotor. In this case, heat may be applied, if necessary. In addition, the aqueous solution after the dissolution may be subjected to filtration. The concentration of the high molecular weight polymer is not particularly limited, but preferably around 1% to 2% in view of undissolved residue.

The high molecular weight polymer is adsorbed by adding the prepared high molecular weight polymer aqueous solution to the carbon material which is a negative electrode active material, and stirring with the use of a disperser or the like. In this case, pure water is preferably added appropriately to provide fluidity. After sufficient stirring for dispersion, the carbon material-containing aqueous solution is held in a constant-temperature bath for drying. In this case, the temperature is preferably kept at 80° C. or lower. The treatment at high temperatures at which the water is bought to the boil, such as around 100° C. unfavorably has a possibility of decreasing the homogeneity of the high molecular weight polymer adsorbed.

With water vaporized to some extent, a step of further extracting water may be added by keeping at high temperature or under vacuum. However, high temperatures at which the high molecular weight polymer is degraded are not preferred.

The obtained negative electrode material is preferably crushed. The crush is not particularly limited, as long as a method is adopted which is common to the graphite material for a lithium ion secondary battery.

<Post-Adsorption>

As another approach, a method may be used in which the high molecular weight polymer is added in the preparation of negative electrode combination slurry. The post-adsorption is required to ensure consistency with the production process, but able to reduce the production cost, as compared with the pre-adsorption.

The method for preparing the negative electrode 12 is not to be considered particularly limited, but for example, a negative electrode active material, a thickener, a water-soluble binder, and in the cased of the post-adsorption, the high molecular weight polymer are put in a solvent, and kneaded and dispersed well with the use of a common kneading and dispersing method such as a ball mill or a planetary mixer to prepare negative electrode combination slurry. Subsequently, this negative electrode combination slurry can be applied onto a collector of metal foil such as copper with the use of an applicator, subjected to vacuum drying at an appropriate temperature around 100° C., and to compression. molding with the use of a pressing machine, and then cut or punched into a desired size to prepare the intended negative electrode 12.

The solvent in the preparation of the negative electrode combination slurry is not particularly limited, but examples of the solvent include, for example, pure water, N-methyl-2-pyrrolidone (NMP), ethylene glycol, toluene, and xylene. In the case of post-adsorption, pure water is particularly preferred.

In addition, regardless of pre-adsorption and post-adsorption, it is particularly preferable to use a binder that uses pure water as a solvent. The carbon material with the adsorbed high molecular weight polymer according to an embodiment of the present invention is highly hydrophilic, and able to enhance the dispersibility of the binder on the surface of the negative electrode material for a lithium ion secondary battery.

As the water-soluble binder, a non-fluorine organic polymer such as an acrylonitrile-butadiene rubber (NBR) and a styrene-butadiene rubber (SBR) may be further added as a binding agent to the negative electrode combination. Furthermore, as the thickener, water-soluble polysaccharide is preferably used in combination. Examples of the water-soluble polysaccharide include methyl cellulose, ethylcellulose, acetyl cellulose, hydroxyethyl cellulose, carboxymethyl cellulose, starch, carrageenan, pullulan, guar gum, xanthan gum (xanthan gum), hydroxypropyl cellulose, and hydroxypropyl methyl cellulose. Some of these celluloses may be turned into salts. In particular, a sodium salt of carboxymethyl cellulose is preferred. These compounds may be used singly, or two or more thereof may be used in combination.

Copper foil of 10 μm to 100 μm in thickness, perforated copper foil of 10 μm to 100 μm in thickness and 0.1 mm to 10 mm in pore size, expanded metal, foamed metal plate, or the like is used for the collector of the negative electrode 12. Besides copper, materials such as stainless steel, titanium, or nickel are also applicable. According to the present invention, any collector can be used without being limited by the material, shape, production method, etc.

The negative electrode slurry obtained by mixing the negative electrode active material, the binder, and the organic solvent can be attached to the collector by a doctor blade method, a dipping method, a spray method, or the like, and then subjected to organic solvent drying, and to pressing by a roll press to prepare a negative electrode. In addition, it is also possible to form a multi-layer compound layer on the collector by the implementation from application to drying more than once.

The negative electrode may be mixed with, as another active material besides the graphite and non-graphite carbon mentioned above, a material that forms an alloy with lithium or a material that forms an intermetallic compound. Examples of the material include, for example, metals such as aluminum, silicon, and tin, and alloys thereof, lithium-containing transition metal nitride $Li_{(3-x)}M_xN$, lower silicon oxide $Li_xSiO_y$, ($0 \le x$, $0 < y < 2$), and lower tin oxide $Li_xSnO_y$, ($0 \le x$, $0 < y < 2$).

<Positive Electrode>

The positive electrode 10 is composed of a positive electrode active material, a conducting agent, a binder, and a collector. To illustrate examples of the positive electrode active material, $LiCoO_2$, $LiNiO_2$, and $LiMn_2O_4$ are typical examples. Besides, the examples can include $LiMnO_3$, $LiMn_2O_3$, $LiMnO_2$, $Li_4Mn_5O_{12}$, $LiMn_{2-x}MxO_2$ (provided that M=at least one selected from the group consisting of Co, Ni, Fe, Cr, Zn, and Ti, x=0.01 to 0.2), $Li_2Mn_3MO_8$ (provided that M=at least one selected from the group consisting of Fe, Co, Ni, Cu, and Zn), $Li_{1-x}A_xMn_2O_4$ (provided that M=at least one selected from the group consisting of Mg, B, Al, Fe, Co, Ni, Cr, Zn, and Ca, x=0.01 to 0.1), $LiNi_{1-x}M_xO_2$ (provided that M=at least one selected from the group consisting of Co, Fe, and Ga, x=0.01 to 0.2), $LiFeO_2$, $Fe_2(SO_4)_3$, $LiCo_{1-x}M_xO_2$ (provided that M=at least one selected from the group consisting of Ni, Fe, and Mn, x=0.01 to 0.2), $LiNi_{1-x}M_xO_2$ (provided that M=at least one selected from the group consisting of Mn, Fe, Co, Al, Ga, Ca, and Mg, x=0.01 to 0.2), $Fe(MoO_4)_3$, $FeF_3$, $LiFePO_4$, and $LiMnPO_4$.

The positive electrode active material has particle sizes typically provided to be equal to or less than the thickness of a combination layer formed from a positive electrode active material, a conducting agent and a binder. When the powder of the positive electrode active material include therein coarse particles which have sizes equal to or more than the thickness of the combination layer, it is preferable to remove the coarse particles by sieve classification or wind flow classification in advance, and prepare particles equal to or less than the thickness of the combination layer.

In addition, a conducting agent composed of a carbon powder is utilized for supplementing electrical conductivity, because the positive electrode active material is generally an oxide-based material, and thus high in electrical resistance. The positive electrode active material and the conducting agent are both typically powders, and the powders can be thus mixed with a binder to bind the powders with each other, and at the same time, bond the powders to the collector.

Aluminum foil of 10 μm to 100 μm in thickness, perforated aluminum foil of 10 μm to 100 μm in thickness and 0.1 mm to 10 mm in pore size, expanded metal, foamed metal plate, or the like is used for the collector of the positive, electrode 10. Besides aluminum, materials such as stainless steel and titanium are also applicable. According to the present invention, any collector can be used without being limited by the material, shape, production method, etc.

The positive electrode slurry obtained by mixing the positive electrode active material, the conducting agent, the binder, and the organic solvent can be attached to the collector by a doctor blade method, a dipping method, a spray method, or the like, and then subjected to organic solvent drying, and to pressing by a roll press to prepare the positive electrode 10. In addition, it is also possible to laminate multiple compound layers on the collector by the implementation from application to drying more than once.

<Separator>

The separator 11 is inserted between the positive electrode 10 and negative electrode 12 prepared by the methods just described to prevent short circuit between the positive electrode 10 and the negative electrode 12. It is possible to use, for the separator 11, a polyolefin polymer sheet composed of polyethylene, polypropylene, or the like, or a two-layer structure obtained by welding a polyolefin polymer and a fluorine polymer sheet typified by polytetrafluoroethylene. In order to keep the separator 11 from being shrunk when the battery temperature increased, a mixture of a ceramic and a binder may be formed in the form of a thin layer on the surface of the separator 11. This separator 11 is required to transmit lithium ions when the battery is charged and discharged, and thus able to be used for lithium ion secondary batteries, typically as long as the separator is 0.01 μm to 10 μm in pore size and 20% to 90% in porosity.

<Electrolyte>

As a typical example of the electrolyte solution which is able to be used according to an embodiment of the present invention, there is a solution of lithium hexafluorophosphate ($LiPF_6$) or lithium borofluoride ($LiBF_4$) as an electrolyte dissolved in a solvent of ethylene carbonate mixed with dimethyl carbonate, diethyl carbonate, ethylmethyl carbonate, or the like. According to the present invention, other electrolyte solutions are also be able to be used without being limited by the type of the solvent or electrolyte or the mixed ratio of the solvent.

Further, examples of the non-aqueous solvent which is able to be used for the electrolyte solution include non-aqueous solvents such as propylene carbonate, ethylene carbonate, butylene carbonate, vinylene carbonate, γ-butyrolactone, dimethyl carbonate, diethyl carbonate, methylethyl carbonate, 1,2-dimethoxyethane, 2-methyltetrahydrofuran, dimethylsulfoxide, 1,3-dioxolan, formamide, dimethylformamide, methyl propionate, ethyl propionate, phosphate triester, trimethoxymethane, dioxolan, diethyl ether, sulfolane, 3-methyl-2-oxazolidinone, tetrahydrofuran, 1,2-diethoxyethane, chloroethylene carbonate, or chloropropylene carbonate. These compounds may be used singly, or two or more thereof may be used in combination. Solvents other than these solvents may be used as long as the solvents are not degraded on the positive electrode 10 or negative electrode 12 built in the lithium ion secondary battery according to the present invention.

Furthermore, examples of the electrolyte include $LiPF_6$, $LiBF_4$, $LiClO_4$, $LiCF_3SO_3$, $LiCF_3CO_2$, $LiAsF_6$, $LiSbF_6$, or imide salts of lithium as typified by lithium trifluoromethane sulfone imide, and a large variety of lithium salts. Non-aqueous electrolyte solutions obtained by dissolving the salts in the solvents mentioned above can be used as electrolyte solutions for the battery. Electrolytes other than these electrolytes may be used as long as the electrolytes are not degraded on the positive electrode 10 and negative electrode 12 of the battery according to the present embodiment.

In the case of using a solid polymer electrolyte (polymer electrolyte), ion-conducting polymers such as polyethylene oxide, polyacrylonitrile, polyvinylidene fluoride, polymethylmethacrylate, polyhexafluoropropylene, and polyethylene oxide can be used for the electrolyte. Cases of using the solid polymer electrolytes have the advantage that the separator 11 can be omitted.

Furthermore, ionic liquids can be used. For example, from 1-ethyl-3-methylimidazolium tetrafluoroborate (EMI-BF4), a mixed complex of a lithium salt $LiN(SO_2CF_3)_2$ (LiTFSI), Triglyme, and Tetraglyme, cyclic quaternary ammonium cations (as exemplified by N-methyl-N-propylpyrrolidinium), and imide anions (as exemplified by bis(fluorosulfonyl)imide), a combination that is not degraded on the positive electrode 10 and negative electrode 12 can be selected, and used for the lithium ion secondary battery according to an embodiment of the present invention.

The lithium ion secondary battery according to an embodiment of the present invention can be produced by, for example, placing the negative electrode 12 and positive electrode 10 as described above with the separator 11 interposed therebetween, and injecting the electrolyte. The structure of the lithium ion secondary battery according to an embodiment of the present invention is not particularly limited, but typically, the positive electrode 10 and negative electrode 12 and the separator 11 which separates the electrodes can be wound to provide a wound electrode group, or the positive electrode 10, the negative electrode 12, and the separator 11 can be stacked to provide a stacked electrode group.

The present invention will be described below in more detail with reference to examples and comparative examples. It is to be noted that the following examples are considered by way of example, and the invention is not to be considered limited to these examples.

EXAMPLE 1

In accordance with the following procedure, a negative electrode active material was synthesized. First, coal tar was subjected to heat treatment at 400° C. with the use of an autoclave to obtain green coke. This green coke was subjected to grinding, and then subjected to calcination in an inert atmosphere at 2800° C. to obtain graphite of 0.3350 nm in graphite interlayer distance ($d_{002}$) This graphite was subjected to grinding with the use of an impact crusher with a classifier, and the coarse powder was removed through a sieve of 300 mesh to provide graphite particles. In that regard, the average particle size was 17.2 μm, the specific surface area was 4.6 $m^2/g$, and the O/C value was 3.1.

For the polymer to be adsorbed, a polyvinyl sulfonic acid was used. The polyvinyl sulfonic acid was added to pure water so that the aqueous solution concentration was 1.0 wt %, and stirred for 8 h with a wave rotor to provide a solution. To 100 g of the graphite particles described above, 100 g of the polyvinyl sulfonic acid aqueous solution was added with stirring. As for the instrument, a homodisperser was used to provide stirring for 1 hour at a rotation speed of 2000 rpm, and provide slurry. The obtained slurry was maintained at 80° C. for 3 hours for drying, and then subjected to vacuum drying at 100° C. for 4 hours.

The obtained massive graphite was crushed with a mixer, classified with the use of a sieve of 50 μm in opening, and regarded as a negative electrode active material for a lithium ion secondary battery (a negative electrode material for a lithium ion secondary battery). In that regard, the average particle size was 17.8 μm, and the specific surface area was 3.2 $m^2/g$.

Subsequently, in accordance with the following procedure, a positive electrode active material was synthesized. As raw materials, a nickel oxide, a manganese oxide, and a cobalt oxide were used, weighed so that the proportions of Ni:Mn:Co were 1:1:1 in atomic ratio, and subjected to grinding and mixing with a wet grinding mill. Next, the ground and mixed powder with polyvinyl alcohol (PVA) added thereto as a binding agent was granulated through a spray dryer. The granulated powder obtained was put in a high-purity alumina container, subjected to calcination for 12 hours at 600° C. for evaporating the PVA, air-cooled, and then crushed. Furthermore, lithium hydroxide monohydrate was added to the crushed powder so that Li:transition metal Mn, Co) was 1:1 in atomic ratio, and sufficiently mixed. This mixed powder was put in a high-purity alumina container, and subjected to main firing for 6 hours at 900° C. The obtained positive electrode active material was crushed and classified with a ball mill. This positive electrode active material was 6 μm in average particle size.

The O/C, S/C, and $SO_3$ peak ratio in the O 1s for the negative electrode active material for a lithium ion secondary battery in the present example were measured with the use of an AXIS-14S type from SHIMADZU/KRATOS as a system. As for the measurement conditions, the X-ray source was monochromatic Al (tube voltage; 15 kV, tube current; 15 mA), the lens condition was HYBRID (analytical area; 600 μm×1000 μm), and the scan speed was adjusted to 20 eV/min.

The pH in the present invention was measured with the use of CyberScan pH 110 from Eutech. The pH was measured, in such a way that 10 g of the prepared graphite with the polymer adsorbed thereon was added to 10 g of pure water, and left still standing for 30 minutes.

The plane spacing $d_{002}$ of (002) plane of the graphite in the present example was measured with the use of an X-ray diffractometer RU200B from Rigaku Corporation. The CuKα line (λ=0.15418 nm) was used for the X-ray source, and the diffraction angle was corrected with the use of Si. The peak obtained by the measurement can be subjected to profile fitting to calculate the $d_{002}$ with the use of the Bragg equation.

The particle size (50% D) of the material in the present example was examined with the use of a laser diffraction/scattering particle size distribution measurement system LA-920 from Horiba, Ltd. As a light source, 1 mW was used from a He—Ne laser, and ion-exchanged water with two droplets of surfactant put therein was adopted as a dispersion medium for the graphite particles. Ultrasonic treatment was carried out for 5 minutes or more in advance, and further carried out during the measurement to make the measurement while preventing aggregation. The 50% accumulation particle size (50% D) from the measurement results was regarded as the average particle size.

The specific surface area of the negative electrode active material for a lithium ion secondary battery in the present example was obtained through an analysis, by a BET method, of an adsorption isotherm measured with equilibrium time for 300 seconds through the use of nitrogen adsorption at 77 K with the use of BELSORP-mini from BEL Japan, Inc after vacuum-drying the negative electrode active material for a lithium ion secondary battery for 3 hours at 120° C.

Next, a lithium ion secondary battery was prepared as follows.

First, the positive electrode was prepared. To 86.0 parts by weight of the positive electrode active material, 6.0 parts by weight and 2.0 parts by weight of powdery carbon and acetylene black were respectively added as conductive materials, a solution of 6.0 parts by weight of PVDF dissolved in NMP was added as a binding agent in advance, and the materials were further mixed with a planetary mixer to prepare positive electrode combination slurry. This slurry was uniformly and evenly applied with an applicator onto both sides of a collector composed of aluminum foil of 20 μm in thickness. After the application, the collector was subjected to compression molding by a roll press, and regarded as the positive electrode.

To 97.0 parts by weight of the negative electrode active material for a lithium ion secondary battery as a negative electrode active material, 1% CMC (carboxymethyl cellulose) aqueous solution, which was equivalent to 1.5 parts by weight of the solid content of the solution, and 40% SBR aqueous solution, which was equivalent to 1.5 parts by weight of the solid content of the solution, were added, and further mixed with a planetary mixer to prepare negative electrode combination slurry. This slurry was uniformly and evenly applied with an applicator onto both sides of a collector composed of rolled copper foil of 10 μm in thickness. After the application, the collector was subjected to compression molding by a roll press, and regarded as the negative electrode.

Then, the positive electrode and the negative electrode are cut into desired sizes, and collecting tabs were each subjected to ultrasonic welding to uncoated sections of the combination layers. As the collecting tabs, an aluminum lead piece and a nickel lead piece were respectively used for the positive electrode and the negative electrode. Thereafter, a separator of 30 μm in thickness, composed of a porous polyethylene film, was wound while being sandwiched between the positive electrode and the negative electrode. This wound body was inserted into a battery can, the collecting tap for the negative electrode was connected by resistance welding to the bottom of the battery can, and a positive electrode lid was connected by ultrasonic welding to the collecting tab for the positive electrode. Next, an electrolyte with 1 mol/l of $LiPF_6$ dissolved therein was injected into a mixed solvent of ethylene carbonate (EC): dimethyl carbonate (DMC): diethyl carbonate (DEC)=1:1:1 in volume ratio, and thereafter, the battery lid was swaged to the battery can for sealing, thereby providing an intended lithium ion secondary battery.

The prepared lithium ion secondary battery was charged up to 4.20 V with a current corresponding to 0.3 C A around ordinary temperature (25° C.), and thereafter, charged at a constant voltage of 4.20 V until the current reached 0.03 C. After a break for 30 minutes, the battery was discharged up to 3.0 V with a constant current corresponding to 0.3 CA. This cycle was repeated four times for initialization, the fourth battery capacity was measured, and the measured battery capacity was regarded as the initial battery capacity. The initial battery capacity was 1.15 Ah.

Next, the charge-discharge cycle was repeated 500 times at 25° C. In each cycle, the battery was charged up to 4.20 V with a current corresponding to 1 C, and thereafter, charged at a constant voltage of 4.20 V until the current reached 0.03 C. As for discharge, the battery was discharged up to 2.7 V with a current corresponding to 1 C. Between the charge and the discharge, a break was taken for 30 minutes. The battery capacity was measured as described above.

The above-mentioned results obtained were used to calculate the cycle capacity maintenance ratio in accordance with the following formula. The result is shown in Table 1.

Cycle Capacity Maintenance Ratio (%)=(Battery Capacity after 1000 Cycles)/(Initial Battery Capacity)

Furthermore, a storage test was carried out at 50° C. The battery was charged up to 4.20 V with a current corresponding to 0.3 C A, and thereafter, charged at a constant voltage of 4.20 V until the current reached 0.03 C. After a break for 30 minutes, the battery was stored for 6 months in a constant-temperature bath at 50° C. After the storage, the battery was taken out of the constant-temperature bath to measure the capacity after leaving the battery for 3 hours around 25° C. The battery capacity was measured as described above.

The above-mentioned result obtained was used to calculate the storage capacity maintenance ratio in accordance with the following formula. The result is shown in Table 1.

Storage Capacity Maintenance Ratio (%)=(Battery Capacity after Storage for 6 months)/(Initial Battery Capacity)

EXAMPLE 2

Except that the input of the polyvinyl sulfonic acid aqueous solution was adapted to 200 g in the treatment for polymer adsorption onto the graphite, the cycle capacity maintenance ratio and the storage capacity maintenance ratio were calculated in the same way as in Example 1. The results are shown in Table 1.

EXAMPLE 3

Except that the type of the high molecular weight polymer was polyvinyl sulfonic acid Na, the cycle capacity maintenance ratio and the storage capacity maintenance ratio were calculated in the same way as in Example 1. The results are shown in Table 1.

EXAMPLE 4

Except that the type of the high molecular weight polymer was polyvinyl sulfonic acid Na, and that the input of the polyvinyl sulfonic acid Na aqueous solution was adapted to 200 g in the treatment for polymer adsorption onto the graphite, the cycle capacity maintenance ratio and the storage capacity maintenance ratio were calculated in the same way as in Example 1. The results are shown in Table 1.

EXAMPLE 5

Except that the input of the polyvinyl sulfonic acid aqueous solution was adapted to 300 g in the treatment for polymer adsorption onto the graphite, the cycle capacity maintenance ratio and the storage capacity maintenance ratio were calculated in the same way as in Example 1. The results are shown in Table 1.

EXAMPLE 6

Except that the input of the polyvinyl sulfonic acid aqueous solution was adapted to 400 g in the treatment for polymer adsorption onto the graphite, the cycle capacity maintenance ratio and the storage capacity maintenance ratio were calculated in the same way as in Example 1. The results are shown in Table 1.

EXAMPLE 7

Except that the type of the high molecular weight polymer was polystyrene sulfonic acid, the cycle capacity maintenance ratio and the storage capacity maintenance ratio were calculated in the same way as in Example 1. The results are shown in Table 1.

EXAMPLE 8

Except that the type of the high molecular weight polymer was polystyrene sulfonic acid, and that the input of the polystyrene sulfonic acid aqueous solution was adapted to 200 g in the treatment for polymer adsorption onto the graphite, the cycle capacity maintenance ratio and the storage capacity maintenance ratio were calculated in the same way as in Example 1. The results are shown in Table 1.

EXAMPLE 9

Except that the type of the high molecular weight polymer was polystyrene sulfonic acid Na, the cycle capacity maintenance ratio and the storage capacity maintenance ratio were calculated in the same way as in Example 1. The results are shown in Table 1.

EXAMPLE 10

Except that the type of the high molecular weight polymer was polystyrene sulfonic acid Na, and that the input of the polystyrene sulfonic acid Na aqueous solution was adapted to 200 g in the treatment for polymer adsorption onto the graphite, the cycle capacity maintenance ratio and the storage capacity maintenance ratio were calculated in the same way as in Example 1. The results are shown in Table 1.

EXAMPLE 11

Except that the type of the high molecular weight polymer was polystyrene sulfonic acid Na, and that the input of the polystyrene sulfonic acid Na aqueous solution was adapted to 300 g in the treatment for polymer adsorption onto the graphite, the cycle capacity maintenance ratio and the storage capacity maintenance ratio were calculated in the same way as in Example 1. The results are shown in Table 1.

EXAMPLE 12

Except that the type of the high molecular weight polymer was polyvinyl sulfonic acid Na, that the input of the polyvinyl sulfonic acid Na aqueous solution was adapted to 200 g in the treatment for polymer adsorption onto the graphite, and that the polyvinyl sulfonic acid Na was added in the preparation of the slurry, rather than pre-adsorption, the cycle capacity maintenance ratio and the storage capacity maintenance ratio were calculated in the same way as in Example 1. The results are shown in Table 1.

EXAMPLE 13

Except that the type of the high molecular weight polymer was polystyrene sulfonic acid Na, that the input of the polystyrene sulfonic acid Na aqueous solution was adapted to 200 g in the treatment for polymer adsorption onto the graphite, and that the polystyrene sulfonic acid Na was added in the preparation of the slurry, rather than pre-adsorption, the cycle capacity maintenance ratio and the storage capacity maintenance ratio were calculated in the same way as in Example 1. The results are shown in Table 1.

COMPARATIVE EXAMPLE 1

Except that the high molecular weight polymer was not adsorbed onto the surface of the graphite, Comparative Example 1 was provided in the same way as in Example 1. The results are shown in Table 1.

COMPARATIVE EXAMPLE 2

Except that the type of the high molecular weight polymer was polyvinyl sulfonic acid Na, and that the input of the polyvinyl sulfonic acid Na aqueous solution was adapted to 500 g in the treatment for polymer adsorption onto the graphite, the cycle capacity maintenance ratio and the storage capacity maintenance ratio were calculated in the same way as in Example 1. The results are shown in Table 1.

COMPARATIVE EXAMPLE 3

Except that the type of the high molecular weight polymer was polystyrene sulfonic acid Na, and that the input of the polystyrene sulfonic acid Na aqueous solution was adapted to 400 g in the treatment for polymer adsorption onto the graphite, the cycle capacity maintenance ratio and the storage capacity maintenance ratio were calculated in the same way as in Example 1. The results are shown in Table 1.

COMPARATIVE EXAMPLE 4

Except that the type of the high molecular weight polymer was polyvinylpyrrolidone, the cycle capacity maintenance ratio and the storage capacity maintenance ratio were calculated in the same way as in Example 1. The results are shown in Table 1.

COMPARATIVE EXAMPLE 5

Except that the type of the high molecular weight polymer was polyvinylpyrrolidone, and that the input of the polyvinylpyrrolidone aqueous solution was adapted to 200 g in the treatment for polymer adsorption onto the graphite, the cycle capacity maintenance ratio and the storage capacity maintenance ratio were calculated in the same way as in Example 1. The results are shown in Table 1.

COMPARATIVE EXAMPLE 6

Except that the type of the high molecular weight polymer was CMC, the cycle capacity maintenance ratio and the storage capacity maintenance ratio were calculated in the same way as in Example 1. The results are shown in Table

COMPARATIVE EXAMPLE 7

Except that the type of the high molecular weight polymer was CMC, and that the input of the CMC aqueous solution was adapted to 200 g in the treatment for polymer adsorption onto the graphite, the cycle capacity maintenance ratio and the storage capacity maintenance ratio were calculated in the same way as in Example 1. The results are shown in Table 1.

<Consideration>

As shown in Table 1, the cycle capacity maintenance ratio (cycle characteristics) and the storage capacity maintenance ratio (high-temperature storage characteristics) are improved when the O/C falls within the range of 4.5% or more and 25% or less, whereas the S/C falls within the range of 0.05% or more and 2.5% or less. In each example, the cycle capacity maintenance ratio is 64% or more, and the storage capacity maintenance ratio is 77% or more.

As described above, the lithium ion secondary battery according to the present invention has excellent high-temperature storage characteristics and cycle characteristics', as compared with the prior art.

REFERENCE SIGNS LIST 10 positive electrode
11 separator
12 negative electrode
13 battery can
14 positive electrode tab
15 negative electrode tab
16 inner lid
17 internal pressure open valve
18 gasket

TABLE 1

| | Polymer Type | Pre- or Post-Adsorption | Polymer Input (g) | Average Particle Size (μm) | Specific Surface Area ($m^2/g$) | O/C (%) | S/C (%) | $SO_3$ Peak Area in O 1s (%) | pH | Cycle Capacity Maintenance Ratio (%) | Storage Capacity Maintenance Ratio (%) |
|---|---|---|---|---|---|---|---|---|---|---|---|
| Example 1 | Polyvinyl Sulfonic Acid | Pre-Adsorption | 100 | 17.8 | 3.2 | 4.6 | 0.08 | 12 | 4 | 75 | 77 |
| Example 2 | Polyvinyl Sulfonic Acid | Pre-Adsorption | 200 | 17.8 | 2.7 | 4.8 | 0.26 | 18 | 4 | 70 | 80 |
| Example 3 | Polyvinyl Sulfonic Acid Na | Pre-Adsorption | 100 | 17.8 | 2.8 | 5.1 | 0.39 | 36 | 8 | 80 | 78 |
| Example 4 | Polyvinyl Sulfonic Acid Na | Pre-Adsorption | 200 | 17.8 | 2.4 | 8.7 | 0.78 | 52 | 8 | 82 | 84 |
| Example 5 | Polyvinyl Sulfonic Acid | Pre-Adsorption | 300 | 17.8 | 2.1 | 14.0 | 1.58 | 61 | 7.9 | 75 | 86 |
| Example 6 | Polyvinyl Sulfonic Acid | Pre-Adsorption | 400 | 18 | 1.8 | 17.0 | 1.68 | 62 | 7.9 | 74 | 88 |
| Example 7 | Polystyrene Sulfonic Acid | Pre-Adsorption | 100 | 17.8 | 2.9 | 5.1 | 0.21 | 15 | 4 | 76 | 78 |
| Example 8 | Polystyrene Sulfonic Acid | Pre-Adsorption | 200 | 17.8 | 2.7 | 5.3 | 0.28 | 22 | 4 | 72 | 80 |
| Example 9 | Polystyrene Sulfonic Acid Na | Pre-Adsorption | 100 | 17.8 | 2.6 | 6.2 | 0.95 | 48 | 8 | 81 | 83 |
| Example 10 | Polystyrene Sulfonic Acid Na | Pre-Adsorption | 200 | 17.8 | 2.1 | 13.5 | 1.23 | 65 | 8 | 77 | 77 |
| Example 11 | Polystyrene Sulfonic Acid Na | Pre-Adsorption | 300 | 17.9 | 1.6 | 21.8 | 2.18 | 68 | 8.2 | 70 | 85 |
| Example 12 | Polyvinyl Sulfonic Acid Na | Post-Adsorption | 200 | 17.8 | 2.7 | 8.7 | 0.58 | 52 | 8 | 82 | 84 |
| Example 13 | Polyvinyl Sulfonic Acid Na | Post-Adsorption | 200 | 17.8 | 2.6 | 9.5 | 1.08 | 65 | 8 | 77 | 77 |
| Comparative Example 1 | — | — | — | 17.2 | 4.6 | 3.1 | 0.00 | 0 | 7 | 63 | 45 |
| Comparative Example 2 | Polyvinyl Sulfonic Acid Na | Pre-Adsorption | 500 | 18.3 | 1.5 | 26.5 | 2.40 | 62 | 8.1 | 52 | 88 |
| Comparative Example 3 | Polystyrene Sulfonic Acid Na | Pre-Adsorption | 400 | 18.2 | 1.4 | 25.5 | 2.10 | 61 | 8.4 | 51 | 88 |
| Comparative Example 4 | Polyvinylpyrrolidone | Pre-Adsorption | 100 | 17.8 | 3.4 | 7.8 | 0.00 | 0 | 7 | 52 | 64 |
| Comparative Example 5 | Polyvinylpyrrolidone | Pre-Adsorption | 200 | 17.9 | 2.5 | 7.2 | 0.00 | 0 | 7 | 41 | 67 |
| Comparative Example 6 | CMC | Pre-Adsorption | 100 | 17.8 | 3.3 | 8.0 | 0.00 | 0 | 7 | 50 | 66 |
| Comparative Example 7 | CMC | Pre-Adsorption | 200 | 17.9 | 2.4 | 7.5 | 0.00 | 0 | 7 | 38 | 62 |

19 PTC element
20 battery lid

The invention claimed is:

1. A negative electrode material for a lithium ion secondary battery, the material having a high molecular weight polymer adsorbed on a carbon material,
wherein an O/C value of surface functional group quantity, the value expressed by the following formula 1, is 4.5% or more and 25% or less in the negative electrode material for a lithium ion secondary battery, and
a S/C value of surface functional group quantity, the value expressed by the following formula 2, is 0.05% or more and 2.5% or less in the negative electrode material for a lithium ion secondary battery O/C Value (%)=O Atom Concentration figured out on the basis of Peak Area of O is Spectrum in X-ray photoelectron spectroscopy (XPS) Analysis/C Atom Concentration figured out on the basis of Peak Area of C 1s Spectrum in XPS Analysis×100     Formula 1

S/C Value (%)=S Atom Concentration figured out on the basis of Peak Area of S 2p Spectrum in X-ray photoelectron spectroscopy (XPS) Analysis/C Atom Concentration figured out on the basis of Peak Area of C 1s Spectrum in XPS Analysis×100.     Formula 2

2. The negative electrode material for a lithium ion secondary battery according to claim 1,
wherein the O/C value of surface functional group quantity is 4.7% or more and 20% or less in the negative electrode material for a lithium ion secondary battery, and
the S/C value of surface functional group quantity is 0.20% or more and 2.0% or less in the negative electrode material for a lithium ion secondary battery.

3. The negative electrode material for a lithium ion secondary battery according to claim 1,
wherein the O/C value of surface functional group quantity is 6.0% or more and 16% or less in the negative electrode material for a lithium ion secondary battery, and
the S/C value of surface functional group quantity is 0.30% or more and 1.5% or less in the negative electrode material for a lithium ion secondary battery.

4. The negative electrode material for a lithium ion secondary battery according to claim 1,
wherein an O is peak appearing around 525 eV to 540 eV has therein a peak derived from $SO_3$, the peak appearing around 531.5 eV.

5. The negative electrode material for a lithium ion secondary battery according to claim 1,
wherein the peak area derived from $SO_3$ accounts for 10% or more in the O 1s, when the O is peak is subjected to curve fitting with peaks derived from $SO_3$, and peaks representing C—O appearing around 533.5 eV and 532 eV, to find the peak area.

6. The negative electrode material for a lithium ion secondary battery according claim 4,
wherein the peak area derived from $SO_3$ accounts for 30% or more in the O is, when the O is peak is subjected to curve fitting with peaks derived from $SO_3$, and peaks representing C—O appearing around 533.5 eV and 532 eV, to find the peak area.

7. The negative electrode material for a lithium ion secondary battery according to claim 1,
wherein the high molecular weight polymer comprises any one or more of a sulfonic acid group, a sulfonate group, and a sulfonyl group.

8. The negative electrode material for a lithium ion secondary battery according to claim 1,
wherein the high molecular weight polymer comprises a functional group in the form of a salt.

9. The negative electrode material for a lithium ion secondary battery according to claim 1,
Wherein carbon (002) plane spacing is 0.334 nm to 0.338 nm when the carbon material is measured with an X-ray diffractometer (XRD).

10. The negative electrode material for a lithium ion secondary battery according to claim 1,
wherein the high molecular weight polymer is one or more of a polyvinyl sulfonic acid, polystyrene sulfonic acid, a polyvinyl sulfonic acid Na, and or polystyrene sulfonic acid Na.

11. A negative electrode for a lithium ion secondary battery, the electrode comprising the negative electrode material for a lithium ion secondary battery according to claim 1, the negative electrode including a binder,
wherein the binder is an aqueous solvent binder.

12. A lithium ion secondary battery comprising the negative electrode for a lithium secondary battery according to claim 11.

13. A method for producing a negative electrode material for a lithium ion secondary battery, the method comprising:
providing the material having a high molecular weight polymer adsorbed on a carbon material,
providing an O/C value of surface functional group quantity where the value expressed by the following formula 1, is 4.5% or more and 25% or less in the negative electrode material for a lithium ion secondary battery,
providing a S/C value of surface functional group quantity where the value expressed by the following formula 2, is 0.05% or more and 2.5% or less in the negative electrode material for a lithium ion secondary battery, and
dispersing the carbon material in 50 mass % purified water so that the purified water has pH of 6 or more O/C Value (%)=O Atom Concentration figured out on the basis of Peak Area of O is Spectrum in X-ray photoelectron spectroscopy (XPS) Analysis/C Atom Concentration figured out on the basis of Peak Area of C 1s Spectrum in XPS Analysis×100     Formula 1

S/C Value (%)=S Atom Concentration figured out on the basis of Peak Area of S 2p Spectrum in X-ray photoelectron spectroscopy (XPS) Analysis/C Atom Concentration figured out on the basis of Peak Area of C 1s Spectrum in XPS Analysis×100.     Formula 2

14. A method for producing a negative electrode for a lithium ion secondary battery, the negative electrode comprising:
a negative electrode material for a lithium ion secondary battery, the material having a high molecular weight polymer adsorbed on a carbon material; and
a binder,
wherein an O/C value of surface functional group quantity, the value expressed by the following formula 1, is 4.5% or more and 25% or less in the negative electrode material for a lithium ion secondary battery,
a S/C value of surface functional group quantity, the value expressed by the following formula 2, is 0.05% or more and 2.5% or less in the negative electrode material for a lithium ion secondary battery, wherein the method comprises the steps of:

preparing negative electrode combination slurry for a lithium ion secondary battery by kneading the carbon material, the high molecular weight polymer, and the binder, applying the negative electrode combination slurry for a lithium ion secondary battery onto a negative electrode collector $$O/C \text{ Value (\%)} = O \text{ Atom Concentration figured out on the basis of Peak Area of } O \text{ is Spectrum in X-ray photoelectron spectroscopy (XPS) Analysis}/C \text{ Atom Concentration figured out on the basis of Peak Area of } C \text{ 1s Spectrum in XPS Analysis} \times 100 \quad \text{Formula 1}$$

$$S/C \text{ Value (\%)} = S \text{ Atom Concentration figured out on the basis of Peak Area of } S \text{ 2p Spectrum in X-ray photoelectron spectroscopy (XPS) Analysis}/C \text{ Atom Concentration figured out on the basis of Peak Area of } C \text{ 1s Spectrum in XPS Analysis} \times 100. \quad \text{Formula 2}$$

\* \* \* \* \*